United States Patent
Asada et al.

(12)

(10) Patent No.: US 6,333,381 B1
(45) Date of Patent: Dec. 25, 2001

(54) RUBBER-CONTAINING STYRENIC RESIN AND PROCESS FOR PRODUCING THE SAME

(75) Inventors: Takeshi Asada; Junichi Sekiguchi; Tadashi Teranishi; Koichi Umemoto; Soko Yanagita, all of Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/440,930

(22) Filed: Nov. 16, 1999

(30) Foreign Application Priority Data

Nov. 20, 1998 (JP) .................................................. 10-331478
Oct. 1, 1999 (JP) .................................................. 11-281461

(51) Int. Cl.[7] .......................... C08F 279/02; C08L 51/04
(52) U.S. Cl. ................................ 525/71; 525/70; 525/83; 525/243; 525/316
(58) Field of Search .................................. 525/71, 70, 73, 525/74, 75, 76, 77, 78, 79, 80, 83, 243, 316

(56) References Cited

U.S. PATENT DOCUMENTS 4,282,334   8/1981   Walter et al. .
4,785,051 * 11/1988  Henton .................................. 525/71

FOREIGN PATENT DOCUMENTS

0726280A1   8/1996   (EP) .
56537 B2    1/1993   (JP) .
6199916 A   7/1994   (JP) .
8239434 A   9/1996   (JP) .
WO9411412   5/1994   (WO) .

* cited by examiner

Primary Examiner—James J. Seidleck
Assistant Examiner—Olga Asinovsky
(74) Attorney, Agent, or Firm—Birch, Stewart, Kolasch & Birch, LLP

(57) ABSTRACT

The rubber-containing styrenic resin of the present invention comprises a styrenic resin matrix and a rubber component dispersed in particles. In the resin, the graft ratio of a styrenic monomer relative to the rubber component is not less than 1, the particle size of the dispersed rubber component is 0.1 to 3 μm, and the following equation (1) is satisfied:

$$Mn = aT + b \qquad (1)$$

wherein Mn is the number average molecular weight of the matrix resin; T is the conversion of the styrenic monomer; a is a constant greater than 0; and b is a constant of 0 or greater. The rubber component may be a butadiene-series rubber. The particle-size distribution of the dispersed rubber component may have, for example, two peaks. Such styrenic resin can be produced by, in the presence of a rubber component, polymerizing at least a styrenic monomer at a graft ratio of not less than 1 under such conditions that the relationship between the conversion T of the styrenic monomer and the number average molecular weight Mn of the polymer can be approximated by a linear equation. According to the present invention, the morphology and the particle size of rubber particles dispersed in a styrenic resin are controllable.

16 Claims, No Drawings

RUBBER-CONTAINING STYRENIC RESIN AND PROCESS FOR PRODUCING THE SAME

FIELD OF THE INVENTION

The present invention relates to a rubber-containing styrenic resin of which the rubber component dispersed therein is controllable in its morphology and particle size, and to a process for producing the same.

BACKGROUND OF THE INVENTION

As a means for improving the impact resistance of a styrenic resin, there has been proposed a styrenic resin containing a rubber component (styrene-butadiene rubber, polybutadiene rubber) such as high impact resistant polystyrene HIPS. Various techniques have been adopted to improve the impact resistance, in which a rubber dispersed in a HIPS is increased in particle size or the rubber content is raised. According to such methods, while the impact resistance of a shaped article is improved to some extent, the surface gloss thereof or other characteristics are deteriorated. On the other hand, a rubber component of smaller particle size or a lower rubber content improves the surface gloss of a shaped article but deteriorates the impact resistance. Therefore, the external appearance and impact resistance cannot both be held at high levels.

Control of the morphology of the rubber component dispersed in particles in the resin (morphology of particles) is suggested to improve the impact resistance or characteristics related to external appearance such as surface gloss. For example, a rubber particle formed such as to have a small particle size and a microdomain structure of the core/shell type (core/shell structure) is useful for improving the surface gloss of a styrenic resin. However, the formation of a styrenic resin having a core/shell morphology requires a rubber component to be efficiently dispersed in a styrenic resin matrix, consequently limiting the range of rubber components available therefor [e.g., rubber components highly compatible with styrenic resins (styrene-butadiene rubber, etc.)]. Therefore, a styrenic resin having a core/shell structure cannot be produced with a conventional diene rubber. Moreover, when a diene rubber is used, the morphology of the resultant resin is a salami structure with a large particle size, and hence no improvement in the surface gloss of a shaped article thereof.

Moreover, for improvements in both surface gloss and impact resistance, there has been proposed an idea of using a HIPS containing small rubber particles having a core/shell structure in combination with a HIPS containing larger rubber particles having a salami structure. However, this method requires specific and peculiar polymerization conditions and a blending step, and hence the operation much complicated.

On the other hand, there has been known a living radical polymerization process which is a combination method of a living polymerization method whereby a primary structure of a polymer (e.g., molecular weight, molecular-weight distribution) is easily controllable and a radical polymerization method which is less sensitive to impurities or solvents. Though the living radical polymerization process is a radical polymerization, this process enables control of the molecular weight and provides a polymer having a narrow molecular-weight distribution.

Japanese Patent Publication No. 6537/1993 (JP-B-5-6537) corresponding to USP or WO discloses a compound as an initiator for the living radical polymerization of an unsaturated monomer. Japanese Patent Application Laid-Open No. 199916/1994 (JP-A-6-199916) corresponding to USP or WO discloses a polymerization method for a thermoplastic resin having a narrow polydispersity, comprising a step of heating a free radical initiator, a stable free radical agent and a polymerizable monomer compound.

Further, Japanese Patent Application Laid-Open No. 239434/1996 (JP-A-8-239434) corresponding to USP or WO discloses a process for producing a composition containing a vinyl aromatic polymer and a rubber, comprising a step of polymerizing a vinyl aromatic monomer in the presence of a rubber. The literature teaches the presence of a stabilized free radical in the polymerization step. However, considering the amount of the rubber used, the degree of improvement in impact resistance in this process, in other words, rubber efficiency, is low.

SUMMARY OF THE INVENTION

Thus, an object of the present invention is to provide a rubber-containing or rubber-modified styrenic resin of which the dispersed rubber is easily controllable in its particle morphology and size according to the intended use, and a process for producing the same.

Another object of the present invention is to provide a rubber-containing or rubber-modified styrenic resin having surface gloss and impact resistance both at high levels, and a process for producing the same.

Still another object of the present invention is to provide a rubber-containing or rubber-modified styrenic resin which is excellent in rubber efficiency, and a process for producing the same.

Another object of the present invention is to provide a rubber-containing or rubber-modified styrenic resin having a microdomain structure of the core/shell type even if the rubber component contained therein is a diene rubber such as polybutadiene, and a process for producing the same.

The inventors of the present invention did intensive and extensive studies to achieve the above objects and found that the morphology or particle size of a rubber component dispersed in a polymer and the molecular weight of a styrenic resin forming a matrix can be controlled by, in the presence of a rubber component, radical-polymerizing a styrenic monomer in a specific manner. The present invention was accomplished based on the above findings.

Thus, the rubber-containing styrenic resin of the present invention comprises a matrix of a styrenic resin and a rubber component in particle form dispersed in the matrix, wherein the graft ratio of a styrenic monomer relative to the rubber component is not less than 1, and the mean particle size of the dispersed rubber component is 0.1 to 3 μm, satisfying the following equation (1):

$$Mn = aT + b \tag{1}$$

wherein Mn is the number average molecular weight of the matrix resin; T is the conversion of the styrenic monomer; a is a constant greater than 0; and b is a constant of not less than 0.

The present invention further includes a styrenic resin comprising a styrenic resin matrix and a rubber component dispersed therein in particles, in which the graft ratio of a styrenic monomer relative to the rubber component is not less than 2.5 and the mean particle size of the dispersed rubber component is about 0.3 to 3 μm.

The above-mentioned rubber component may be a butadiene-series rubber (e.g., a diene rubber). The particle-size distribution of the dispersed rubber component may show, for example, a plurality of peaks (i.e., the particle-size distribution having a plurality of peaks, particularly two peaks) or a single-peak, and the morphology (microdomain structure) of the dispersed rubber component may for example be of the salami type (salami structure), core/shell type (core/shell structure), or a mixed or complex type thereof.

The present invention further includes a process for producing a rubber-containing styrenic resin in which, under such conditions that the relationship between the conversion T of a styrenic monomer and the number average molecular weight Mn of the resulting polymer can be approximated by a linear equation, at least a styrenic monomer is polymerized in the presence of a rubber component at a graft ratio of not less than 1.

In this specification, acrylic monomers and methacrylic monomers are collectively referred to as "(meth)acrylic monomer.

DETAILED DESCRIPTION OF THE INVENTION

The rubber-containing styrenic resin of the present invention comprises a matrix of a styrenic resin and a rubber component dispersed in the matrix, and the graft ratio of the styrenic monomer relative to the rubber component is not less than 1.

The styrenic resin forming the matrix may comprises a homopolymer or copolymer of a styrenic monomer, a copolymer of a styrenic monomer and a copolymerizable vinyl monomer, or the like.

As the styrenic monomer, there may be mentioned, for example, styrene, alkylstyrenes [e.g., monoalkylstyrens such as vinyltoluenes (e.g., o-, m-, p-methylstyrenes), vinylxylenes (e.g., 2,4-dimethylstyrene), and alkyl-substituted styrenes (e.g., $C_{1-4}$alkylstyrenes) such as ethylstyrene, p-isopropylstyrene, butylstyrene, and p-t-butylstyrene; dialkylstyrenes (di$C_{1-4}$alkylstyrenes such as 2,4-dimethylstyrene); α-alkyl-substituted styrenes (e.g., α-$C_{1-2}$alkylstyrenes such as α-methylstyrene and α-methyl-p-methylstyrene], alkoxystyrenes (e.g., $C_{1-4}$alkoxystyrenes such as o-methoxystyrene, m-methoxystyrene, p-methoxystyrene, p-t-butoxystyrene), halostyrenes (e.g., o-, m-, and p-chlorostyrenes, p-bromostyrene), styrene sulfonic acid and alkaline metal salts thereof. These styrenic monomers can be used either singly or in combination. These styrenic monomers can be used either singly or in combination. The preferred styrenic monomer includes styrene, vinyltoluenes, and α-methylstyrene, with styrene particularly preferred.

As the copolymerizable vinyl monomer, there may be exemplified α,β-unsaturated nitriles [e.g., vinyl cyanides such as (meth)acrylonitrile, halogenated (meth)acrylonitrile (chloro(meth)acrylnitrile, etc.)], α,β-unsaturated carboxylates (particularly, alkylesters) [e.g., (meth)acrylic acid alkylesters; (meth)acrylic acid $C_{5-7}$cycloalkylesters such as cyclohexyl (meth)acrylate; (meth)acrylic acid $C_{6-12}$aryl esters such as phenyl (meth)acrylate; (meth)acrylic acid $C_{7-14}$aralkyl esters such as benzyl (meth)acrylate; or maleic acid mono- or dialkylester, fumaric acid mono- or dialkylesters, and itaconic acid mono- or dialkylesters corresponding to these (meth)acrylic acid esters], vinyl ester-series monomers [e.g., carboxylic acid vinyl esters such as $C_{1-10}$ carboxylic vinyl esters typified by vinyl formate, vinyl acetate, vinyl propionate, vinyl pivalate (particularly, $C_{1-6}$ carboxylic acid vinyl esters)], hydroxyl group-containing monomers [e.g., hydroxyalkyl(meth)acrylates such as hydroxyethyl(meth)acyrlate and hydroxypropyl(meth)acrylate (e.g., hydroxy$C_{1-10}$alkyl(meth)acrylates, preferably, hydroxy$C_{1-4}$alkyl(meth)acrylates)], glycidyl group-containing monomers [e.g., glycidyl (meth)acrylate], carboxyl group-containing monomers [e.g., α,β-unsaturated monocarboxylic acids such as (meth)acrylic acid; α,β-unsaturated polycarboxylic acids such as maleic acid, fumaric acid, and itaconic acid; or acid anhydrides thereof (e.g., maleic anhydride, fumaric anhydride)], amino group-containing monomers [e.g., N,N-dimethylaminoethyl (meth)acrylate, N,N-diethylaminopropyl (meth)acrylate], amide-series monomers [e.g., (meth)acrylamide, or derivatives thereof (e.g., N-methyl(meth)acrylamide, N,N-dimethyl(meth)acrylamide, N-methylol(meth)acrylamide), or fumaric acid amides corresponding thereto (e.g., fumaramide, fumaramic acid, or derivatives thereof)], imide-series monomers (e.g., maleimide, N-$C_{1-4}$alkyl maleimides such as N-methylmaleimide, N-phenylmaleimide), conjugated diene-series monomers [e.g., $C_{4-16}$ dienes such as butadiene, isoprene, chloroprene, neoprene, 1,3-pentadiene, 1-chlorobutadiene, 2,3-dimethyl-1,3-butadiene, 3-butyl-1,3-octadiene, and phenyl-1,3-butadiene (preferably, $C_{4-10}$ dienes)], olefinic monomers [e.g., $C_{2-10}$ alkenes such as ethylene, propylene, butene (e.g., isobutene)], vinyl halides (e.g., vinyl fluoride, vinyl chloride, vinyl bromide, vinyl iodide), and vinylidene halides (e.g., vinylidene fluoride, vinylidene chloride, vinylidene bromide, vinylidene iodide). The (meth)acrylic acid alkylester includes (meth)acrylic acid $C_{1-20}$alkyl esters such as methyl (meth)acrylate, ethyl (meth)acrylate, butyl (meth)acrylate, t-butyl (meth)acrylate, hexyl (meth)acrylate, octyl (meth)acrylate, 2-ethylhexyl (meth)acrylate, and lauryl (meth)acrylate (preferably, (meth)acrylic acid $C_{1-14}$alkyl esters).

The preferred vinyl-series monomer includes (meth)acrylic monomers [e.g., (meth)acrylic acid, (meth)acrylates (particularly, methyl methacrylate, acrylic acid $C_{2-10}$alkyl esters), (meth)acrylonitrile].

These vinyl monomers can be used either singly or in combination. The amount of such copolymerizable monomer can be selected from the range of, e.g., about 0 to 50% by weight and preferably of about 0 to 30% by weight.

The weight average molecular weight Mw of the matrix resin comprised of a styrenic resin is about 100,000 to 500,000, preferably about 150,000 to 300,000. A Mw smaller than 100,000 leads to poor rigidity, and a Mw exceeding 500,000 might cause deterioration in fluidity and moldability.

As the rubber component, use can be made of a variety of rubbery polymers (e.g., diene rubbers such as butadiene rubber and isoprene rubber; sytrene-diene copolymerized rubbers such as styrene-butadiene rubber and styrene-isoprene rubber; ethylene-vinyl acetate copolymer, acrylic rubber, ethylene-propylene rubber (EPDM)). Preferred as the rubber component is a diene-series rubber component (e.g., a conjugated 1,3-diene rubber and a derivative thereof, such as butadiene, isoprene, 2-chloro-1,3-butadiene, and 1-chloro-1,3-butadiene). Particularly preferred is a butadiene-series rubber (a diene rubber typified by butadiene rubber). These rubber components can be used either singly or in combination.

The weight average molecular weight of the rubber component is about $1 \times 10^4$ to $2 \times 10^6$, preferably about $5 \times 10^4$ to $1 \times 10^6$, and more preferably about $1 \times 10^5$ to $5 \times 10^5$.

As the rubber-modified styrenic resin, there may be exemplified high impact resistance polystyrenes (HIPS), styrene-butadiene-styrene (SBS resin), styrene-isoprene-styrene (SIS resin), acrylonitrile-butadiene-styrene copolymer (ABS resin), acrylonitrile-acrylic rubber-styrene copolymer (AAS resin), acrylonitrile-(ethylene-propylene rubber)-styrene copolymer, acrylonitrile-EPDM-styrene copolymer (AES resin), and methyl methacrylate-butadiene-styrene copolymer (MBS resin), with HIPS and ABS resin particularly preferred.

In the rubber-modified styrenic resin, the content of the rubber component such as polybutadiene is about 1 to 20% by weight (e.g., 3 to 20% by weight), preferably about 2 to 15% by weight (e.g., 5 to 15% by weight). When the rubber component content is not more than 1% by weight, the impact resistance is insufficient for practical use, and a rubber component content exceeding 20% by weight makes the rubber-modified styrenic resin prone to suffer from deterioration in surface gloss and rigidity.

In the rubber-containing styrenic resin of the present invention, the most efficient use can be made of the rubber component (high rubber efficiency), and therefor, the rubber-containing styrenic resin presents a high surface gloss even if the particle size of the rubber component dispersed therein is large and shows excellent impact strength even with a low rubber content. These characteristics are due to the graft ratio thereof being high.

The graft ratio (g-value) is the ratio of the amount of the styrenic monomer relative to that of the rubber component and measured in the following manner. 1 g of a styrenic resin is dissolved in 35 ml of a mixed solvent [methyl ethyl ketone/acetone (1/1 v/v)], and the mixture is subjected to a centrifuge to give an insoluble portion or matter, and the weight fraction (on solid basis) of the insoluble portion is defined as a "gel portion". The weight fraction of the rubber contained in 1 g of the styrenic resin measured according to the iodometry is defined as a "rubber content". The graft ratio is represented by the following equation.

$$\text{Graft ratio}=[\text{gel portion}(g)-\text{rubber content}(g)]/\text{rubber content}(g)$$

The g-value is an index representing the degree of grafting of the styrenic monomer relative to the rubber component, and the g-value is not less than 1 (e.g., not less than 2), preferably about 1 to 5, and more preferably about 1.5 to 3 (e.g., 2 to 3). A g-value smaller than 1 means that the proportion of the grafted styrenic monomer is small relative to the rubber content, which leads to a reduction in rubber efficiency and deterioration in impact resistance. Moreover, a g-value exceeding 5 causes deterioration in rigidity, and hence ill-balanced physical properties insufficient for practical use.

In the rubber-containing styrenic resin, the rubber component is dispersed in the styrenic resin matrix in particles.

Both of the surface gloss and impact strength of the styrenic resin are influenced by the particle size of the rubber component dispersed in the styrenic resin matrix. The particle size of the dispersed rubber is an average value calculated in the following manner. A transmission electron photomicrograph of an ultra-thin slice cut from the styrenic resin is taken, and measurements of the particle size are made for 1000 particles of the rubbery polymer regarded as of spheres. The mean particle size is represented by the following formula:

$$\text{Mean particle size}=(\Sigma n_i D_i^4)/(\Sigma n_i D_i^3)$$

In the equation, $n_i$ represents the number of rubbery polymer particles regarded as of spheres having a particle size $D_i$ ($\mu$m).

The mean particle size of the dispersed rubber is about 0.1 to 3 $\mu$m, preferably 0.3 to 2 $\mu$m, more preferably about 0.3 to 1.5 $\mu$m, and usually about 0.2 to 2 $\mu$m. A mean particle size smaller than 0.1 $\mu$m deteriorates the impact resistance, and a mean particle size exceeding 3 $\mu$m degrades the surface gloss.

From the rubber-containing styrenic resin of the present invention can be obtained a highly glossy shaped article even if the mean particle size of the dispersed rubber is relatively large, and it may be due to its high graft ratio. For example, a shaped article having a high gloss can be obtained even though the mean particle size is 0.3 to 2 $\mu$m (e.g., 0.5 to 2 $\mu$m), preferably about 0.4 to 1.5 $\mu$m, and 0.5 to 1.2 $\mu$m.

The morphology of the dispersed rubber particle (the microdomain structure of the rubber-containing styrenic resin) may be a core/shell structure (e.g., a structure in which a single styrenic resin phase is contained or confined within one rubber particle) or a salami structure (e.g., a structure in which a plurality of styrenic resin phases are confined within one rubber particle, and the styrenic resin phases are partitioned from each other by the rubber phase), or a mixed or complex structure thereof.

In the core/shell structure, the mean particle size of the dispersed rubber component is about 0.1 to 1 $\mu$m, preferably about 0.2 to 0.8 $\mu$m, and more preferably about 0.3 to 0.7 $\mu$m. As can be understood from the above, even if a diene rubber (e.g., polybutadiene) is employed, the present invention can provide not only a rubber-containing styrenic resin having a core/shell structure and a small mean particle size but also a rubber-containing styrenic resin containing constant and fine rubber component particles, 90% (by volume) and more (preferably 95% and more) of the rubber particles each containing three occlusions or less. Since the resin having a core/shell structure can be formed even with a butadiene rubber which is inexpensive, a styrenic resin of high surface gloss can be manufactured at low cost. The core/shell structure seems to improve the gloss, transmittance and transparency.

According to the present invention, since rubber particles can be formed with a polymer solution of relatively low viscosity, as will later be described, the rubber particle can be formed not only such as to have a core/shell structure and a relatively small mean particle size as was described above but also such as to have a core/shell structure and a larger particle size, such large particle size having been difficult to achieve. As for the large particles with the core/shell structure, the mean particle size of the dispersed rubber component is about 0.5 to 3 $\mu$m, preferably about 0.7 to 2.5 $\mu$m. The resin containing large rubber particles of core/shell structure is highly glossy and excellent in impact strength and therefore can be used as a base resin for an alloy.

In the salami structure, the mean particle size of the dispersed rubber component is about 0.3 to 3 $\mu$m, preferably about 0.5 to 2.5 $\mu$m (e.g., 0.7 to 2.5 $\mu$m).

The particle-size distribution of the dispersed rubber component may have a single peak or a plurality of peaks as in the case with a bimodal structure [i.e., the particle-size distribution has two peaks (e.g., rubber particles with a core/shell structure and those with a salami structure are contained in mixture].

The rubber-containing styrenic resin having the bimodal structure is excellent in impact strength as compared to a single-peak styrenic resin having a core/shell structure, and the surface gloss thereof is substantially comparable to a single-peak resin.

When the microdomain structure is of the salami type (salami structure) or bimodal type (bimodal structure), further control of the particle size makes it possible to apply the rubber-containing styrenic resin of the present invention for uses requiring a higher gloss, improves the rubber efficiency, and reduces the cost.

In the case of the bimodal structure, the particle-size distribution of the dispersed rubber particles may for example has two peaks: one for core/shell rubber particles and salami rubber particles (salami rubber particles containing not more than three occlusions) having mean particle sizes in the range of about 0.1 to 1 μm (preferably 0.1 to 0.5 μm) and the other for salami rubber particles having a mean particle size in the range of about 0.5 to 5 μm (preferably, 1 to 3 μm). When the mean particle size of the small particles is smaller than 0.1 μm or that of the large particles is smaller than 0.5 μm, the impact resistance of the resin is insufficient. When the mean particle size of the small particles exceeds 1 μm or that of the large particles exceeds 5 μm, the surface gloss of the resin is degraded. Particularly, when the mean particle size of the large particles is outside the above-mentioned range, the impact resistance or surface gloss is adversely affected.

In the rubber-containing styrenic resin having the bimodal structure, suitable control of the conditions mentioned above allows the rubber component in small particles and large particles to be present in mixture in desired proportions. The proportions thereof are not particularly restricted, and the ratio of the small rubber particles to the large rubber particles is, for example, about 40/60 to 95/5 (volume ratio), preferably about 60/40 to 90/10 (volume ratio). A ratio smaller than 40/60 might lead to deterioration in surface gloss and a ratio greater than 95/5 might lower the impact resistance, and therefore, the resin cannot have well-balanced surface gloss and impact resistance both at high levels.

In the case of a rubber-containing styrenic resin having the bimodal structure, the volume ratio of the small rubber particle to the large rubber particle is obtained by figuring out the volumes of the large rubber particle and the small rubber particle individually from the particle sizes obtained from measurements made for 1000 or more rubber polymer particles regarded as of spheres which are randomly chosen from transmission type electron photomicrographs, and then calculating from the number of large particles, that of small particles and the volumes obtained above with the following equation. A core/shell rubber particle and a salami rubber particle (a particle containing not more than three occlusions) each having a particle size of about 0.1 to 1 μm are defined as small rubber particles, and a salami rubber particle having a particle size of about 1 to 5 μm is defined as a large rubber particle.

Volume ratio=$\Sigma p_i V_i / \Sigma q_i W_i$

In the equation, $p_i$ is the number of small rubbery polymer particles having a volume $V_i$; $q_i$ is the number of large rubbery polymer particles having a volume $W_i$.

The present invention further includes a rubber-containing styrenic resin having a g-value of as high as not less than 2.5 (e.g., 2.5 to 5), preferably about 3 to 5, and a mean particle size of a rubber component dispersed therein of about 0.3 to 3 μm, preferably 0.4 to 2 μm. In such styrenic resin, a diene rubber (particularly, polybutadiene) is a preferred rubber component.

In the rubber-containing styrenic resin of the present invention, there is a relationship between the number average molecular weight Mn of the sytrenic matrix resin and the conversion T of the styrenic monomer, which is represented by the following equation (1):

$$Mn=aT+b \quad (1)$$

wherein Mn is the number average molecular weight of the matrix resin; T is the conversion of the styrenic monomer; a is a constant greater than 0, b is a constant of 0 or greater; and the number average molecular weight Mn represents the number average molecular weight of the matrix resin calculated based on a gel permeation chromatography measurement made of a solubilized portion of 1 g of the rubber-containing styrenic resin dissolved in 35 mL of a mixed solvent [methyl ethyl ketone/acetone (1/1 v/v)].

In other words, in the polymerization of the sytrenic monomer, since the relationship between the conversion T of the styrenic monomer and the number average molecular weight Mn of the styrenic resin forming the matrix can be approximated with a linear equation, the molecular weight of the matrix resin is controllable with accuracy by controlling the conversion. In the above equation (1), the constants "a" and "b" respectively represent the slope and the intercept of the approximated straight line obtained by plotting the relationship between the number average molecular weight Mn and the conversion T. The constant "a" is greater than 0, and b is 0 or greater.

Accordingly, the above-mentioned rubber-containing styrenic resin can be produced by polymerizing at least the styrenic monomer in the presence of the rubber component at a graft ratio of not less than 1 under such conditions that the relationship between the conversion T of the styrenic monomer and the number average molecular weight Mn can be approximated by a linear equation.

The system in which the polymerization reaction is carried out is not limited to a batch or semi-batch system. Even when polymerizing in a continuous system, the relationship between the conversion T and the number average molecular weight Mn can be approximated with a linear equation by extrapolating the values of the conversion T and the number average molecular weight Mn measured at a plurality of points (e.g., two points) in the course of the polymerization process (or route).

In the polymerization, when the conversion T of the styrenic monomer is 10 to 80%, the Mn of the matrix resin is usually about 20,000 to 300,000 (e.g., 20,000 to 200,000), preferably about 50,000 to 200,000. A Mn (T) on phase inversion or transformation (a Mn measured at the time where rubber particles are being formed from the liquid phase as the polymerization reaction proceeds) smaller than 20,000 renders the dispersed rubber particles after the phase inversion (or phase transformation) unstable, resulting in difficulty in retaining the particle size. A Mn (T) on phase inversion exceeding 200,000 or a Mn (L) on completion of the reaction exceeding 300,000 raises the viscosity of the polymerization system too much, thus making it difficult to efficiently disperse the rubber component. Incidentally, the phrase "on phase inversion (or transformation)" means "the time rubber particles are being produced from the liquid phase as the polymerization proceeds, corresponding to the time the conversion reaches about 10 to about 20% by weight", and the phrase "on completion of the reaction" means, though it depends on reaction conditions, "the time the rate of polymerization reaches a predetermined value, corresponding to the time the conversion reaches about 60 to about 90%".

The above-mentioned Japanese Patent Application Laid-Open No. 199916/1994 (JP-A-6-199916) discloses that the thermoplastic resin is obtained by heating a mixture of a free radical initiator, a stable free radical agent, and a polymerizable monomer such as styrene. In this system, however, since the number average molecular weight in the initial stage of the polymerization is as small as about 2000, it is difficult to disperse a rubber component in particles.

When polymerizing according to the bulk polymerization method, the Mn (T) of the matrix resin on phase inversion (a conversion of about 10% to about 20%) is about 20,000 to 200,000, and the Mn (L) of the matrix resin on completion of the reaction (a conversion of about 60% to about 90%) is about 50,000 to 300,000. In sofar as the number average molecular weight is in the above-mentioned range, the particle size can be controlled such as to be within a suitable range, thus providing a styrenic resin of excellent impact strength. Moreover, the value Mn (L) is 1.5 times the value Mn (T) or more (e.g., about 1.5 to 15 times), and preferably 1.7 times the value Mn (T) or more (about 1.7 to 15 times). A Mn (L) smaller than a value of 1.5 times the Mn (T) might not sufficiently improve the impact resistance due to the dispersed rubber particle size being too small. When the conversion is practically lower than about 60%, it is desirable that the number average molecular weight is in the range mentioned above by extrapolating the approximation equation (linear equation) representing the relationship between the conversion and the number average molecular weight.

To be more specific, the Mn (L) of a rubber-containing styrenic resin with a bimodal microdomain structure is, for example, about 1.5 to 15 times and preferably about 1.7 to 15 times the value of the Mn (T) [Mn(L)/Mn(T)]. When the ratio Mn (L)/Mn (T) is smaller than 1.5, the resin sometimes cannot have a bimodal structure. A Mn (L) exceeding fifteen times the value Mn (T) raises the molecular weight of a matrix resin as the polymerization reaction proceeds, with an increase in the viscosity of the reaction system. This leads to a decrease in operating efficiency and deterioration in the flowability and moldability of the resulting resin.

When examined with an electron microscope, the rubber phase in the microdomain structure of the rubber-containing styrenic resin is observed to be thin. The further the graft-polymerization proceeds, the stronger tendency toward the core/shell microdomain structure the rubber-containing styrenic resin has, but it might sometimes be of the salami type (salami structure) under certain conditions (e.g., shearing, viscosity). Moreover, according to the present invention, since the radical reaction proceeds in a specific manner, the polymerization can be effected even if the viscosity of the polymerization system during the initial stages of the polymerization is relatively low as compared to that in a conventional radical polymerization reaction. Therefore, application of a larger shearing force allows the rubber component to have a core/shell structure.

In the polymerization reaction, a polymerization initiator may be added. Addition of a polymerization initiator provides a higher g-value. As the polymerization initiator, use can be made of conventional ones, such as organic peroxides represented by ketone peroxides (e.g., cyclohexanone peroxide, 3,3,5-trimethylcyclohexanone peroxide, and methylcyclohexanone peroxide); peroxyketals (e.g., 2,2-bis (4,4-di-t-butylperoxycyclohexyl)propane, 1,1-bis(t-butylperoxy)- 3,3,5-trimethylcyclohexane, 1,1-bis(t-butylperoxy)cyclohexane, n-butyl-4,4-bis(t-butylperoxy) valate; hydroperoxides (e.g., cumene hydroperoxide, diisopropylbenzene hydroperoxide, 2,5-dimethylhexane-2, 5-dihydroperoxide); dialkyl peroxides (e.g., di-t-butyl peroxide, dicumyl peroxide, t-butyl cumyl peroxide, α,α'- bis(t-butylperoxy-m-isopropyl)benzene, 2,5-dimethyl-2,5-di(t-butylperoxy)hexyne-3); diacyl peroxides (e.g., benzoyl peroxide, decanoyl peroxide, lauroyl peroxide, 2,4-dichlorobenzoyl peroxide); peroxycarbonates (e.g., bis(t-butylcyclohexyl)peroxydicarbonate); peroxy acid esters (t-butyl peroxy benzoate, 2,5-dimethyl-2,5-di(benzoyl peroxy)hexane), inorganic peroxides such as hydrogen peroxide, persulfates (e.g., potassiumpersulfate, ammoniumpersulfate), and mixtures thereof (e.g., substituted benzoyl peroxide mixtures, such as m-toluyl & benzoyl peroxide (trade name: Niper BMT-K40)].

As the polymerization initiator, an azo compound may be used, and examples of which are azobisnitriles [e.g., 2,2'-azobisbutylonitriles typified by 2,2'-azobisisobutylonitrile (AIBN) and 2,2'-azobis(2-methylbutylonitrile); 2,2'-azobisvaleronitriles typified by 2,2'-azobis(4-methoxy-2,4-dimethylvaleronitrile) and 2,2'-azobis(2,4-dimethylvaleronitrile); 2,2'-azobispropionitriles such as 2,2'-azobis(2-hydroxymethylpropionitrile); 1,1'-azobis-1-alkanenitriles such as 1,1'-azobis(cyclohexane-1-carbonitrile), particularly 1,1'-azobis-1 -cycloalkanenitriles (e.g., 1,1'-azobis-1-$C_{5-8}$cycloalkanenitrile); azobiscyanocarboxylic acids typified by 4,4'-azobis(4-cyanovaleric acid); azobutyronitriles typified by azonitrile [2-(carbamoylazo) isobutyronitrile; azovaleronitriles typified by 2-phenylazo-4-methoxy-2,4-dimethylvaleronitrile; azobisalkanes [e.g., 2,2'-azobis$C_{3-10}$alkanes typified by 2,2'-azobis(2-methylpropane) and 2,2'-azobis(2,4,4-trimethylpentane); and dimethyl 2,2'-azobisisobutylate.

These polymerization initiators can be used either singly or in combination.

The ratio of the polymerization initiator to the styrenic monomer is about 0.001/100 to 10/100 (molar ratio), and preferably about 0.01/100 to 1/100 (molar ratio). A ratio smaller than 0.001/100 (molar ratio) may lower the rate of polymerization and the g-value. Further, a ratio exceeding 10/100 (molar ratio) accelerates the rate of polymerization too much, hence difficulty in controlling the polymerization reaction.

When polymerizing, an additive (or controlling agent or compound) may be added to control the molecular weight, etc. In sofar as the above-mentioned equation is satisfied, the additive (controlling compound) is not particularly restricted, but a hydroxyamine, a nitroso compound and a nitrone compound respectively shown by the following formulae (2) to (4) are preferred.

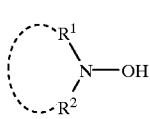

(2)

(3)

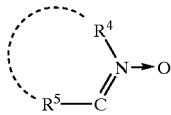

(4)

wherein $R^1$ to $R^5$ are the same or different, each representing a hydrogen atom, an alkyl group, an alkoxy group, an acyl group, an alkenyl group, an cycloalkyl group, an aryl group, or an aralkyl group group; the groups $R^1$ and $R^2$, and the groups $R^4$ and $R^5$ may individually bond together to form rings.

Examples of the alkyl groups represented by the groups $R^1$ to $R^5$ are straight- or branched $C_{1-10}$alkyl groups such as methyl, ethyl, propyl, isopropyl, 1-ethylpropyl, butyl, isobutyl, s-butyl, t-butyl, pentyl, t-pentyl, isopentyl, hexyl, 1,1-diethylpropyl, octyl, isooctyl, and decyl.

As the alkoxy group, there may be exemplified $C_{1-10}$alkoxy groups such as methoxy, ethoxy, propoxy, isopropoxy, butoxy, isobutoxy, s-butoxy, t-butoxy, pentyloxy, and hexyloxy.

As the acyl group, there may be exemplified $C_{2-10}$acyl groups such as acetyl, propionyl, butyryl, isobutyryl, valeryl, and hexanoyl.

As the alkenyl group, there may be exemplified $C_{2-10}$alkenyl groups such as vinyl, 1-propenyl, 2-propenyl, isopropenyl, 2-butenyl, and 2-hexenyl.

As the cycloalkyl group, there may be exemplified $C_{4-10}$cycloalkyl groups such as cyclobutyl, cyclopentyl, cyclohexyl, cycloheptyl, and cyclooctyl (particularly, $C_{5-8}$ cycloalkyl groups such as cyclopentyl group or cyclohexyl group). Examples of aryl group are $C_{6-10}$aryl groups such as phenyl group and naphthyl group. As the aralkyl group, there may be mentioned, for example, $C_{6-10}$aryl-$C_{1-4}$alkyl groups such as benzyl, phenethyl, and naphthylmethyl group.

In the formulae (2) to (4), each of $R^1$ and $R^2$ is preferably an alkyl group (e.g., a $C_{1-6}$- alkyl group, particularly a $C_{1-4}$alkyl group), an alkoxy group (e.g., a $C_{1-4}$ alkoxy group), or an acyl group (e.g., a $C_{1-4}$ acyl group), and $R^3$ is preferably an aryl group (e.g., a $C_{6-12}$ aryl group), an aralkyl group (e.g., a $C_{7-14}$ aralkyl group), or a group represented by the following formula (3a):

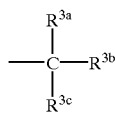

(3a)

wherein $R^{3a}$ to $R^{3c}$ are the same or different from each other, each representing a hydrogen atom, an alkyl group, or an aryl group; and at least two of the groups $R^{3a}$ to $R^{3c}$ may bond together to form a ring. Each of $R^{3a}$ to $R^{3c}$ is preferably an alkyl group (e.g., a $C_{1-4}$ alkyl group).

Each of $R^4$ and $R^5$ is preferably an alkyl group [e.g., a $C_{1-10}$ alkyl group, preferably a $C_{1-8}$ alkyl group, more preferably a branched alkyl group such as a t-$C_{4-8}$ alkyl group (particularly, t-butyl group)], or an aryl group [e.g., a $C_{6-12}$ aryl group (particularly phenyl group)]. Moreover, the groups $R^1$ and $^2$, and the groups $R^4$ and $R^5$ may individually bond together to form rings (preferably 4- to 8-membered rings), and at least two of the groups $R^{3a}$ to $R^{3c}$ may bond together to form a ring (preferably a 4- to 8-membered ring), such as heterocycles such as azepine, pyrroline, pyrrolenine, pyridine, azepine, azocine, Preferred as the heterocycle is a 5- or 6-membered ring containing a nitrogen atom as a hetero atom, such as pyrroline and pyridine. The ring may be any one of aromatic, non-aromatic ring, and condensed rings (e.g., quinoline, isoquinoline, indoline). Moreover, the same or different carbon atoms each constituting the ring may be substituted with one or a plurality of substituents such as an alkyl group(s) (e.g., $C_{1-4}$ alkyl groups such as methyl, ethyl, propyl, isopropyl, and butyl groups).

The groups $R^1$ to $R^5$ each may have a substituent. Examples of the substituent are alkyl groups (e.g., $C_{1-6}$ alkyl groups such as methyl, ethyl, propyl, isopropyl, and butyl groups); aryl groups (e.g., $C_{6-10}$ aryl groups such as phenyl and naphthyl groups); amino group; N-monoalkyl-substituted amino group (e.g., mono-$C_{6-10}$alkyl-substituted amino groups such as methylamino group and ethylamino group); N,N-dialkyl-substituted amino group (di-$C_{1-6}$alkyl-substituted amino groups such as dimethylamino group and diethyl amino group); acylamino (e.g., $C_{1-6}$acylamino groups such as formylamino and acetylamino); halogen atoms; halogenated alkyl groups; carbonyl groups; and hydroxy group.

Examples of the hydroxyamine (2) are linear hydroxylamines typified by hydroxylamines which may have a substituent such as an alkyl group, an alkoxy group, an alkenyl group, an aryl group, or an aralkyl group (e.g., N-mono-substituted hydroxylamines such as $C_{1-6}$alkylhydroxylamines typified by methylhydroxylamine and ethylhydroxylamine, $C_{1-6}$alkoxyhydroxylamines, methoxyhydroxylamine; $C_{6-12}$arylhydroxylamines typified by phenylhydroxylamine; N,N-di-substituted hydroxylamines such as di$C_{1-6}$alkylhydroxylamines typified by dimethylhydroxylamine, diethylhydroxylamine, and methylethylhydroxylamine, $C_{1-6}$alkyl-$C_{1-6}$alkoxyhydroxylamines typified by ethylmethoxyhydroxylamine); N-hydroxyimides of aliphatic dicarboxylic acids (e.g., N-hydroxysuccinic acid imide, N-hydroxymaleimide); and cyclic hydroxylamines such as N-hydroxyimides of non-aromatic cyclic dicarboxylic acids (e.g., N-hydroxytetrahydrophthalimide, N-hydroxyhexahydrophthalimide); crosslinked cyclic dicarboxylic acid imides (e.g., N-hydroxyhetic acid imide, N-hydroxyhimic acid imide), and aromatic dicarboxylic imides (e.g., N-hydroxyphthalic imide, N-hydroxytrimellitic acid, N-hydroxy-methylcyclohexene tricarboxylic acid imide) with N,N-di-$C_{1-4}$alkylhydroxylamines and aromatic dicarboxylic acid imides (e.g., N-hydroxyphthalimide) particularly preferred.

The hydroxyamines (2) can be used either singly or in combination.

As the nitroso compound (3), there may be mentioned, e.g., nitrosoalkanes which may be substituted with a substituent selected from those mentioned above (e.g., nitroso$C_{1-10}$alkanes, preferably nitroso$C_{2-10}$alkanes such as nitrosomethane, nitrosoethane, 1-nitrosopropane, 2-nitrosopropane, 2-nitrosobutane, 2-methyl-1-nitrosopropane, 2-methyl-2-nitrosopropane (BNO), 2-methyl-2-nitrosobutane, 3-methyl-3-nitrosopentane, 3-ethyl-3-nitrosopentane, 3-methyl-3-nitrosohexane, 3-ethyl-3-nitrosohexane, 3-ethyl-3-nitrosoheptane, 4-ethyl-4-nitrosoheptane, 4-propyl-4-nitrosoheptane); nitrosocycloalkanes (e.g., nitroso$C_{4-8}$cycloalkanes such as nitrosocyclopentane and nitrosocyclohexane); nitrosobenzenes which may have a substituent (e.g., nitrosobenzene (NB), nitrosotoluene (o-, m-, p-body), di-$C_{1-4}$alkylamino-nitrosobenzens such as p-dimethylamino-nitrosobenzene (DMNA); and nitrosonaphthalene. Examples of the preferred N-substituted nitroso compound are compounds in which at least two of the groups $R^{3a}$ to $R^{3c}$ in the formula (3a) are the same or different from each other each representing an alkyl group (particularly, a $C_{1-3}$ alkyl group), nitroso-t-alkanes (e.g., 2-alkyl-2-nitrosopropane), and nitrosobenzenes. These nitroso compounds (3) can be used either singly or in combination.

Incidentally, the nitroso compound (3) can be used not only in the form of a monomer but also in the form of a dimer.

As the nitrone compound (4), there may be exemplified linear nitrone compounds such as N-$C_{1-8}$alkyl-α-$C_{1-8}$alkylnitrones (e.g., N-methyl-α-methylnitrone, N-methyl-α-ethylnitrone), N-$C_{1-8}$alkyl-α-$C_{6-12}$arylnitrones (e.g., N-methyl-α-phenylnitrone, N-ethyl-α-phenylnitrone, N-isopropyl-α-phenylnitrone, N-isobutyl-α-phenylnitrone, N-s-butyl-α-phenylnitrone, N-t-butyl-α-phenylnitrone (PBN), N-t-pentyl-α-phenylnitrone), N-$C_{1-10}$alkyl-α-$C_{5-8}$cycloalkylnitrones (e.g., compounds corresponding to the N-alkyl-α-arylnitrones listed above such as N-isopropyl-α-cyclohexylnitrone, N-isobutyl-α-cyclohexylnitrone, N-s-butyl-α-cyclohexylnitrone, N-t-butyl-α-cyclohexylnitrone, and N-t-pentyl-α-cyclohexylnitrone), N-aryl-α-arylnitrones (e.g., N-phenyl-α-phenylnitrone); and cyclic nitrone compounds such as pyrroline-N-oxides (e.g., 1-pyrroline-N-oxide, 5,5-dimethyl-1-pyrroline-N-oxide (DMPO), 5,5-diethyl-1-pyrroline-N-oxide, 4,4-diethyl-1-pyrroline-N-oxide, 3,3-dimethyl-1-pyrroline-N-oxide), pyrrole-N-oxide, pyridine-N-oxide (PO), and piperazine-N-oxide. N-t-$C_{4-8}$alkyl-α-arylnitrones such as N-t-butyl-α-phenylnitrone (PBN), pyrroline-N-oxides such as 5,5-dimethyl-1-pyrroline-N-oxide (DMPO) and pyridine N-oxide are particularly preferred.

These nitrone compounds (4) can be used either singly or in combination.

These additives (2) to (4) can be used either singly or in combination.

The ratio of the additive (controlling agent) to the polymerization initiator is about 0.01/1 to 100/1 (molar ratio), preferably about 0.01/1 to 10/1 (molar ratio), more preferably about 0.1/1 to 10/1 (e.g., 0.1/1 to 5/1), and particularly about 0.1/1 to 2/1. When the ratio is smaller than 0.01/1 (molar ratio), it is difficult to precisely control the molecular weight, and a ratio exceeding 100/1 (molar ratio) might lower the rate of polymerization.

In Japanese Patent Application Laid-Open No. 239434/1996 (JP-A-8-239434), 2,2,6,6-tetramethyl-1-piperidinyloxy (TEMPO) is used as a free radical stabilizer, which corresponds to an additive used in the present invention. However, the g-value of this system is smaller than 1, and hence low rubber efficiency. Moreover, in Japanese Patent Publication No. 6537/1993 (JP-B-5-6537), a compound which, upon thermal decomposition, produces a free radical capable of initiating a polymerization and a nitroxide group is used as a reversible terminating agent for a radical polymerization. However, in this system, it is difficult to efficiently control the molecular weight.

The polymerization method of the styrenic monomer is not particularly limited, and may be a conventional one (e.g., bulk polymerization, solution polymerization, suspension polymerization, emulsion polymeization, bulk-suspension polymerization).

Particularly preferred is a bulk polymerization or bulk-suspension polymerization in which a rubber component dissolved in a styrenic monomer is bulk-polymerized and then, if necessary, suspension-polymerized. Moreover, the polymerization can be initiated by, e.g., heating the system or irradiating the system with light or radiations.

In the bulk-polymerization method which is advantageous in industrial production, a solvent may be added. The species of the solvent is not particularly limited, and a conventional one may be used. Examples of which are aromatic hydrocarbons (e.g., benzene, toluene, ethylbenzene, xylene), alicyclic hydrocarbons (e.g., cyclohexane), and aliphatic hydrocarbons (e.g., hexane, octane), ketones (e.g., methyl ethyl ketone), esters (e.g., ethyl acetate), and ethers (e.g., 1,4-dioxane).

The amount of the solvent can be selected from the range of, relative to the total amount of the reaction mixture, about 0 to 30% by weight, preferably of 5 to 20% by weight. When the proportion of the solvent exceeds 30% by weight, there arises the need for the recovery of the solvent. This might lead to a decrease in economical efficiency.

The polymerization may be conducted under atmospheric pressure or applied pressure.

The polymerization temperature can be selected from the range of about 80 to 180° C. and preferably of about 90 to 150° C., depending on the polymerization method, the constituent(s) of the polymerization initiating system, the rate of polymerization, etc. A polymerization temperature below 80° C. lowers the productivity. A temperature above 180° C. might reduce the molecular weight of the resin, leading to deterioration in impact resistance, or it accelerates the reaction rate, making it difficult to control the polymerization reaction.

Usually, the polymerization may be carried out in an atmosphere of an inert gas typified by nitrogen, helium, argon, for example, under a stream of an inert gas.

The polymerization may be carried out in any system selected from a batch system, a semi-batch system, and a continuous system. For example, the polymerization may be carried out according to a continuous polymerization method, such as a multistage bath continuous polymerization method, a multistage column continuous polymerization method, or a combination thereof.

According to the process of the present invention, the morphology of a rubber-containing styrenic resin is easily controllable with accuracy. For example, a rubber-containing styrenic resin mainly having a core/shell structure can be prepared by, in the above-polymerization reaction, carring on shearing (steering) a resin composition until the conversion becomes relatively high, or adding (admixing) a styrenic monomer at the point where the molecular weiht of the matrix resin gets relatively high, under such conditions that shearing force efficiently acts on the rubber component, such as the molecular weight of the matrix resin being relatively high (a relatively small difference between the matrix resin and the rubber component in viscosity). Suitably selected conditions allows the rubber component of the rubber-containing styrenic resin to have a single peak particle-size distribution. When preparing a rubber-containing styrenic resin with the core/shell structure, a polymerization reaction may be carried out initially at a suitable stirring speed (e.g., about 70 to 100 rpm), then at a lower stirring speed (e.g., about 15 to 30 rpm) decreased at the time where the conversion of a styrenic monomer reaches about 25 to 50%. Thereafter, the composition may further be polymerized, or may further be polymerized after being additionally mixed with a styrenic monomer to temporarily decrease the viscosity of the polymerization system. Incidentally, if no styrenic monomer is further added, it may be possible to provide a rubber-containing styrenic resin having a morphology of the salami type.

The rubber-containing styrenic resin having a bimodal morphology comprised of both salami and core/shell structures can be prepared by, under such conditions that the shearing force applied to the rubber component is reduced, e.g., the molecular weight of the matrix resin being relatively low (a relatively large difference between the matrix resin and the rubber component in viscosity), decreasing the shearing speed at a relatively early stage of the polymerization, or further adding a styrenic monomer at a stage where the molecular weight of the matrix resin is low. When preparing the rubber-containing styrenic resin having the bimodal structure, for example, a resin composition may be polymerized at a suitable stirring speed (e.g., about 70 to 100 rpm, then at a lower stirring speed (e.g., about 15 to 30 rpm) decreased at the point the conversion of the styrenic monomer is about 20 to 40%, and, optionally, further polymerized or further polymerized after being mixed with an additional styrenic monomer thereby to temporarily decrease the viscosity of the polymerization system.

When adding a styrenic monomer to the polymerization system, in sofar as the relationship between the conversion $T_1$ of the styrenic monomer before being added and the molecular weight $Mn_1$ of the matrix resin and the relationship between the conversion $T_2$ of the styrenic monomer after being added and the molecular weight $Mn_2$ of the matrix resin can be approximated by linear equations individually, the time to add the monomer and the amount thereof are not particularly restricted. The amount of the styrenic monomer added is, for example, about 5 to 50% by weight (e.g., about 10 to 40% by weight) relative to the total amount of the styrenic monomer.

As was described above, suitable control of the conditions enables one to produce a resin having a salami or core/shell structure according to the intended use, and also to vary the ratio of the rubber particles with a core/shell structure to those with a salami structure. To summarize, according to the process of the present invention, the microdomain structure (e.g., the morphology (configuration), particle size of the dispersed rubber particles) of a rubber-containing structure is controllable.

The rubber-containing styrenic resin obtained by the above reaction may optionally be separated or purified by diluting with a solvent and then precipitating in a poor solvent or removing a volatile matter such as the monomer or solvent.

To the rubber-containing styrenic resin of the present invention may be added a conventional additive, such as a stabilizer [e.g., an antioxidant (phenolic antioxidant, phosphoric antioxidant, and the like), an ultraviolet ray absorber, thermostabilizer], a flame retardant, a lubricant (zinc stearate, calcium stearate, ethylenebisstearylamide, and the like), a mold lubricant or parting agent, an antistatic agent, a filler, a colorant (titanium oxide, red iron oxide, colorants of azo compounds, perylene, phthalocyanine, and heterocyclic-series compounds, and the like), a plasticizer, and a spreading agent (or texture) (e.g., polyethylene glycol, mineral oil).

The rubber-containing styrenic resin of the present invention may be used as a resin composition (e.g., polymer blend or polymer alloy) by being used in combination with a variety of resins (e.g., thermoplastic resins, thermosetting resins, thermoplastic elastomers). For example, the rubber-containing styrenic resin of the present invention may be melt-mixed with a polystyrenic resin to be used as a polymer blend, or may be mixed or melt-mixed with a resin other than polystyrenes (e.g., styrene-butadiene rubber, polyphenylene ether resin, polycarbonates, polyesters) to be used as a polymer blend.

According to the present invention, a rubber-containing styrenic resin is produced by a specific radical polymerzation, and this allows one to easily control the morphology and the particle size of the dispersed rubber according the intended use, realizes a high rubber efficiency, and gives highly improved surface gloss and impact resistance to the styrenic resin. The styrenic resin is excellent in surface gloss even if the particle size of the dispersed rubber is large. Moreover, even with a low rubber content, the styrenic resin is excellent in impact resistance. Furthermore, the present invention makes it possible to allow a rubber-containing styrenic resin to have a microdomain structure of the core/shell type, even if a diene rubber is employed as a rubber component.

EXAMPLES

Hereinafter, the present invention will be described in further detail with reference to the following examples and should by no means be construed as defining the scope of the invention.

In the following Examples and Comparative Examples, unless specifically stated otherwise, all operations were conducted under a stream of nitrogen gas with a polymerization apparatus composed of a 20 L reactor equipped with a stirrer and a deaerating apparatus-equipped biaxial extruder connected to the reactor.

The Izod impact strength, rigidity, surface appearance, the rate of polymerization, molecular weight, the constants a and b, and the content of particles with a core/shell structure of the styrenic resins obtained in Examples and Comparative Example were measured in accordance with the following methods.

[Izod Impact Strength]

Measured in accordance with JIS (Japanese Industrial standards) K7710

[Rigidity (Modulus of Bending Elasticity]

Measured in accordance with JIS K7203

[Surface Appearance (Degree of Gloss]]

The gloss (degree of gloss) was measured, at an incidence angle of 60°, in accordance with JIS K7105.

[Rate of Polymerization (Conversion)]

The monomer remaining in the reaction solution obtained by the polymerization was determined using a gas chromatography (GC, manufactured by Shimazu Seisakusho, Co., Ltd., column: PEG 20M) in accordance with the internal standard method (internal standard reagent: dimethylformamide), and the decrement of the monomer was calculated as the conversion (the rate of polymerization) to the polymer.

[Molecular Weight]

The number average molecular weight Mn (T) and Mn (L) and the weight average molecular weights (Mw) upon phase inversion (the time the conversion to the matrix resin reaches about 10% to about 20%) and completion of the reaction (the time the conversion to the matrix resin reaches about 60 to about 90%) were measured with a gel permeation chromatography (manufactured by Shimazu Seisakusho, Co., Ltd.) under the following conditions.

Column: Shodex K-806L, three columns arranged in line

Solvent: THF

Column temperature: 40° C.

Detector: differential refractometer (RI)

Flow rate: 0.8 mL/min.

[Constants "a" and "b"]

The constants "a" and "b" were calculated from the obtained number average molecular weight Mn and the conversion using the equation (1).

[Content of Core/shell Structure Particle (Small Particles)]

A transmission-type electron photomicrograph of the composition was taken using an ultra-thin slice cut therefrom and, of about 1000 rubbery polymer particles, the percentage by volume of the particles each containing three or less occlusions was calculated.

Example 1

In 150 mol of styrene monomer were dissolved 1.3 kg of polybutadiene (manufactured by Asahi Chemical Industry, Co., Ltd., Diene 35A), 150 mmol of a polymerization initiator (manufactured by NOF Corporation, Niper BMT-K40) and 75 mmol of an additive [diethylhydroxylamine (Daicel Chemical Industries, Co., Ltd.], and the solution was fed to the reactor. The solution was polymerized at 95° C. and a stirring speed of 85 rpm for 3.5 hours, then at a temperature raised up to 130° C. for further polymerization. At the point where the conversion reached about 30%, the stirring speed was decreased down to 20 rpm and the polymerization was allowed to proceed further. Thereafter, at the point of a conversion exceeding 70%, the monomer left unreacted was removed at 230° C. with the extruder equipped with the deaerating apparatus. The melt strand extruded from the extruder was cooled and cut to give a sample in pellet form. The physical properties of the sample was measured, and the results are shown in Tables 1 and 2.

Example 2

In 100 mol of styrene monomer were dissolved 1.3 kg of polybutadiene (manufactured by Asahi Chemical Industry, Co., Ltd., Diene 35A), 75 mmol of a polymerization initiator (manufactured by NOF Corporation, Niper BMT-K40) and 37.5 mmol of an additive (manufactured by Daicel Chemical Industries, Co., Ltd., diethylhydroxylamine), and the solution was fed to the reactor. The solution was polymerized at a stirring speed of 85 rpm and 95° C. for 3.5 hours, then at a temperature raised up to 130° C. for further polymerization. When the conversion was about 40%, 50 mol of a styrene monomer was added. When the conversion of the entire polymerization system reached about 40% again, the stirring speed was decreased down to 20 rpm and the polymerization was allowed to proceed further. At the point where the conversion exceeded 70%, the monomer left unreacted was removed at 230° C. with the extruder equipped with the deaerating apparatus. The melt strand obtained was cooled and cut to give a sample in pellet form. The physical properties of the sample were measured, and the results are shown in Tables 1 and 2.

Example 3

In 150 mol of styrene monomer were dissolved 1.3 kg of polybutadiene (Asahi Chemical Industry Co., Ltd., Diene 35A), 100 mmol of a polymerization initiator (Niper BMT-K40, manufactured by NOF Corporation) and 50 mmol of an additive (manufactured by Tokyo Kasei, Co., Ltd., 2-methyl-2-nitrosopropane), and the solution was fed to the reactor. The solution was polymerized at a stirring speed of 85 rpm and 95° C. for 3.5 hours, then at 130° C. and the polymerization was allowed to proceed further. When the conversion reached about 30%, the stirring speed was decreased down to 20 rpm and the polymerization was allowed to proceed further. At the point of a conversion exceeding 70%, the monomer left unreacted was removed at 230° C. with the extruder equipped with the deaerating apparatus. The melt strand obtained was cooled and cut to give a sample in pellet form. The physical properties of the sample were measured, and the results are shown in Tables 1 and 2.

Comparative Example 1

In a 150 mol of styrene monomer were dissolved 1.3 kg of polybutadiene (Asahi Chemical Industry Co., Ltd., Diene 35A), 150 mmol of a polymerization initiator [Niper BMT-K40, manufactured by NOF Corporation] and 180 mmol of TEMPO (manufactured by Aldrich Chemical Company, Inc.), and the solution was fed to the reactor. The solution was polymerized at a temperature of 95° C. and a stirring speed of 85 rpm for 3.5 hours, then at a temperature raised up to 130° C. for further polymerization. At the point of a conversion of about 30%, the stirring speed was decreased down to 20 rpm and the polymerization was allowed to proceed further. At the point of a conversion exceeding 70%, the monomer left unreacted was removed at 230° C. with the extruder equipped with the deaerating apparatus. The melt strand extruded from the extruder was cooled and cut to give a sample in pellet form. The physical properties of the sample were measured, and the results are shown in Tables 1 and 2.

Comparative Example 2

In a 150 mol of styrene monomer were dissolved 1.3 kg of polybutadiene (Asahi Chemical Industry Co., Ltd., Diene 35A), 15 mmol of a polymerization initiator [Niper BMT-K40, manufactured by NOF Corporation] and 45 mmol of TEMPO (manufactured by Aldrich Chemical Company, Inc.), and the solution was fed to the reactor. The solution was polymerized at a temperature of 95° C. and a stirring speed of 85 rpm for 3.5 hours, then at a temperature raised up to 130° C. for further polymerization. At the point the conversion was about 30%, the stirring speed was decreased down to 20 rpm and the polymerization was allowed to proceed further. At the point of a conversion exceeding 70%, the monomer left unreacted was removed at 230° C. with the extruder equipped with the deaerating apparatus. The melt strand obtained was first cooled and then cut to give a sample in pellet form. The physical properties of the sample were measured, and the results are shown in Tables 1 and 2.

Comparative Example 3

In 150 mol of styrene monomer were dissolved 1.3 kg of a styrene-butadiene copolymerized rubber (manufactured by Nippon Zeon Co., Ltd., NS-312) and 15 mmol of a polymerization initiator (Perbutyl Z, manufactured by NOF Corporation), and the solution was fed to the reactor. The solution was polymerized at 110° C. and a stirring speed of 20 rpm. At the point of a conversion of about 40%, the stirring speed was decreased down to 10 rpm, and the polymerization was allowed to proceed further. Thereafter, at the point the conversion exceeded 70%, the monomer left unreacted was removed with the extruder equipped with the deaerating apparatus at 230° C. The melt strand extruded from the extruder was cooled and cut to give a sample in pellet form. The physical properties of the sample were measured, and the results are shown in Tables 1 and 2.

Example 4

In 150 mol of styrene monomer were dissolved 1.3 kg of polybutadiene (manufactured by Asahi Chemical Industry Co., Ltd., Diene 35A), 200 mmol of a polymerization initiator (Niper BMT-K40, manufactured by NOF Corporation) and 100 mmol of an additive (diethylhydroxylamine, manufactured by Daicel Chemical Industries, Co., LTd.), and the solution was fed to the reactor. The solution was polymerized at a stirring speed of 85 rpm and 95° C. for 3.5 hours, then at a temperature raised up to 130° C. for further polymerization. At the point the conversion reached about 30%, the stirring speed was decreased down to 20 rpm, and the polymerization was allowed to proceed further. Thereafter, at the point of a conversion exceeding 70%, the monomer left unreacted was removed at 230° C. with the extruder equipped with the deaerating apparatus. The obtained melt strand was cooled and cut to give a sample in pellet form. The physical properties of this sample were measured, and the results are shown in Tables 1 and 2.

Example 5

In 100 mol of styrene monomer were dissolved 1.3 kg of polybutadiene (manufactured by Asahi Chemical Industry, Co., Ltd., Diene 35A) were dissolved 100 mmol of a polymerization initiator (Niper BMT-K40, manufactured by NOF Corporation), and 50 mmol of an additive (diethylhydroxylamine, manufactured by Daicel Chemical Industries, Co., Ltd.), and the solution was fed to the reactor. The polymerization was carried out at a stirring speed of 85 rpm and 95° C. for 3.5 hours, then at a temperature raised up to 130° C. for further polymerization. At the point the conversion was about 30%, 50 mol of a monomer were added. When the conversion of the entire polymerization system reached about 30% again, the stirring speed was decreased down to 20 rpm, and the polymerization was allowed to proceed further. At the point of a conversion exceeding 70%, the monomer left unreacted was removed with an extruder equipped with a deaerating apparatus at 230° C. The obtained melt strand was cooled and cut to give a sample in pellet form. The physical properties of the sample were measured, and the results are shown in Tables 1 and 2.

Example 6

In a mixture of 50 mol of acrylonitrile monomer and 87 mol of styrene monomer were dissolved 1.3 kg of polybutadiene (manufactured by Asahi Chemical Industry Co., Ltd., Diene 35A), 328 mmol of a polymerization initiator (Niper BMT-K40, manufactured by NOF Corporation) and 328 mmol of an additive (diethylhydroxylamine, manufactured by Daicel Chemical Industries, Co., Ltd.), and the solution and 3.25 kg of ethylbenzene were fed to the reactor. The mixed solution was polymerized at a steering speed of 85 rpm and 80° C. for 3.5 hours, then at a temperature raised up to 130° C. for further polymerization. When the conversion of the entire polymerization system reached about 40%, the steering speed was decreased down to 25 rpm, and the polymerization was allowed to proceed further. At the point of a conversion exceeding 65%, the monomer left unreaced was removed at 230° C. with the extruder equipped with the deaerating apparatus. The melt strand obtained was cooled and cut to give a sample in pellet form. The physical properties of the sample were measured, and the results are shown in Tables 1 and 2.

Example 7

In a mixture of 50 mol of acrylonitrile monomer and 87 mol of styrene monomer were dissolved 1.3 kg of polybutadiene (manufactured by Asahi Chemical Industry Co., Ltd., Diene 35A), 328 mmol of a polymerization initiator (Niper BMT-K40, manufactured by NOF Corporation) and 820 mmol of an additive (diethylhydroxylamine, manufactured by Daicel Chemical Industries, Co., Ltd.), and the solution and 3.25 kg of ethylbenzene were fed to the reactor. A polymerization was carried out at a stirring speed of 85 rpm and 80° C. for 3.5 hours, then at a temperature raised up to 130° C. for further polymerization. When the conversion of the entire polymerization system reached about 40%, the stirring speed was decreased down to 25 rpm, and the polymerization was allowed to further proceed to further. At the point of a conversion exceeding 65%, the monomer left unreacted was removed at 230° C. with the extruder equipped with the deaerating apparatus. The melt strand obtained were cooled and cut to give a sample in pellet form. The physical properties of the sample were measured, and the results are shown in Tables 1 and 2.

Incidentally, in Table 1, the Mn (T) and Mn (L) stand for the number average molecular weight of the matrix resin upon phase inversion (a conversion of the styrenic monomer of about 10% to about 20%) and that upon completion of the reaction (a conversion of the styrenic monomer of about 60 to about 90%), respectively, and Mw represents the weight average molecular weight of the pellet so obtained.

TABLE 1

| | Mn (T) ($\times 10^{-4}$) | Mn (L) ($\times 10^{-4}$) | Mn (L)/ Mn (T) | a | b | Mw (pellet) ($\times 10^{-4}$) |
|---|---|---|---|---|---|---|
| Ex. 1 | 5.2 | 12.5 | 2.53 | 1084 | 40176 | 20.2 |
| Ex. 2 | 6.1 | 13.2 | 2.16 | 900* | 42500* | |
| | | | | 781* | 67322* | 23.8 |
| Ex. 3 | 3.5 | 11.8 | 3.37 | 1296 | 14992 | 18.7 |
| Comp. Ex. 1 | 1.2 | 7.1 | 5.92 | 918 | 707 | 13.0 |
| Comp. Ex. 2 | 5.5 | 12.2 | 2.22 | 1039 | 37963 | 20.6 |
| Comp. Ex. 3 | 13.2 | 14.8 | 1.12 | 214 | 127739 | 24.6 |
| Ex. 4 | 4.0 | 10.1 | 2.53 | 988 | 24291 | 24.8 |
| Ex. 5 | 5.0 | 14.3 | 2.86 | 1000* | 29667* | |
| | | | | 1313* | 38919* | 23.5 |
| Ex. 6 | 5.1 | 8.5 | 1.67 | 680 | 37400 | 15.6 |
| Ex. 7 | 3.5 | 5.7 | 1.63 | 440 | 26200 | 9.8 |

TABLE 2

| | Mean Particle Size (μm) | Core/shell Particle Content (%)*** | g-value | Izod Impact Strength (kgf · cm/cm²) | Modulus of Bending Elasticity (kgf/cm²) | Degree of Gloss (%) |
|---|---|---|---|---|---|---|
| Ex. 1 | 0.8 | 7.0 | 2.7 | 7.5 | 21,500 | 98 |
| Ex. 2 | 0.5 | 95.8 | 2.8 | 5.8 | 22,300 | 104 |
| Ex. 3 | 1.1 | 2.0 | 2.5 | 6.8 | 21,100 | 97 |
| Comp. Ex. 1 | 3.5 | — | 1.3 | 5.5 | 16,200 | 35 |
| Comp. Ex. 2 | 2.2 | 1.8 | 0.9 | 4.5 | 17,500 | 50 |
| Comp. Ex. 3 | 0.2 | 98.3 | 3.6 | 4.8 | 21,500 | 105 |
| Ex. 4 | 0.2 (80.2%)** 1.1 (19.8%)** | 100 small particle | 3.1 | 9.5 | 19,700 | 92 |
| Ex. 5 | 0.2 (88.6%)** 1.3 (11.4%)** | 100 small particle | 2.9 | 8.2 | 20,500 | 95 |
| Ex. 6 | 0.6 | — | 1.8 | 16.5 | 22,800 | 85 |
| Ex. 7 | 1.0 | — | 2.0 | 16.0 | 23,000 | 78 |

In Tables, an upper figure with the symbol "*" is the value before the further addition of the monomer, and a lower figure is the value after the further addition of the monomer. An upper figure with the symbol "" is the mean particle size of the small particles in the bimodal morphology, and a figure within a round bracket ( ) is the percentage of the small particles being present in the resin (the small rubber particles expressed by percent by volume relative to the entire rubbery polymer). A lower figure is the mean particle size of the large particles in the bimodal morphology, and a figure in a bracket ( ) is the percentage of the large particles being present in the resin (the large rubber particles expressed by percent by volume relative to the entire rubbery polymer). The symbol "*" is the content (volume %) of particles each containing three or less occlusions.

As obvious from Tables, the Izod impact strength, modulus of bending elasticity, and the degree of gloss in every Example were all more excellent than those in Comparative Examples 1 with a dispersed rubber particle size exceeding 3 μm and Comparative Example 2 with a g-value smaller than 1, and the impact strength and rubber efficiency in each Example were high even if the particle size was small.

Moreover, the rubber-containing styrenic resins with a core/shell structure of Examples 1 to 2 presented the gloss of substantially the same degree as that of the styrene-butadiene rubber-employed resin in Comparative Example 3 despite the facts that their dispersed rubber particles had larger particle sizes and that the resins had higher impact resistance than in Comparative Example 3.

What is claimed is:

1. A grafted rubber-containing styrenic resin comprising a matrix comprising a styrenic resin and a rubber component dispersed therein in particle form, wherein the graft ratio of a styrenic monomer relative to the rubber component is not less than 1, and the mean particle size of the dispersed rubber component is 0.1 to 3 μm, satisfying the following equation (1):

$$Mn = aT + b \qquad (1)$$

wherein Mn represents the number average molecular weight of the matrix resin, T represents the conversion of the styrenic monomer to the matrix resin, a is a constant greater than 0, and b is a constant greater than or equal to 0, wherein the equation (1) means that the relationship between T and Mn can be approximated by a linear equation.

2. The grafted rubber-containing styrenic resin according to claim 1, wherein the graft ratio is 1 to 5.

3. The grafted rubber-containing styrenic resin according to claim 1, wherein the graft ratio is not less than 2, and the mean particle size of the rubber component is 0.1 to 3 μm.

4. The grafted rubber-containing styrenic resin according to claim 1, wherein the styrenic monomer is at least one member selected from the group consisting of styrene, a vinyltoluene and α-methylstyrene.

5. The grafted rubber-containing styrenic resin according to claim 1, wherein the matrix comprises a copolymer of a styrenic monomer and at least one copolymerizable vinyl monomer selected from the group consisting of an α,β-unsaturated nitrile, an α,β-unsaturated carboxylic acid ester, a vinyl ester-series monomer, a hydroxyl group-containing vinyl monomer, a glycidyl group-containing vinyl monomer, a carboxyl group- or acid anhydride group-containing vinyl monomer, an amino group-containing vinyl monomer, an amide-series vinyl monomer, an imide-series vinyl monomer, a conjugated diene-series monomer, an olefinic monomer, a vinyl halide, and a vinylidene halide.

6. The grafted rubber-containing styrenic resin according to claim 1, wherein the weight average molecular weight Mw of the matrix is 100,000 to 500,000.

7. The grafted rubber-containing styrenic resin according to claim 1, wherein the rubber component is a diene-series rubber.

8. The grafted rubber-containing styrenic resin according to claim 1, wherein the rubber component is a butadiene-series rubber.

9. The grafted rubber-containing styrenic resin according to claim 1, wherein the content of the rubber component is 1 to 20% by weight.

10. The grafted rubber-containing styrenic resin according to claim 1, wherein the number average molecular weight Mn (T) at the time the conversion reaches about 10 to about 20% by weight is 20,000 to 200,000, and the number average molecular weight Mn (L) at the time the conversion reaches about 60 to about 90% by weight is 50,000 to 300,000.

11. The grafted rubber-containing styrenic resin according to claim 1, wherein the mean particle size of the dispersed rubber particle is 0.1 to 1 μm, and the microdomain structure is (1) a core/shell structure or (2) 90% or more of the dispersed rubber particles are particles each containing not more than three occlusions.

12. The grafted rubber-containing styrenic resin according to claim 1, wherein the mean particle size of the dispersed rubber component is 0.5 to 3 μm, and the microdomain structure is a core/shell structure.

13. The grafted rubber-containing styrenic resin according to claim 1, wherein the particle-size distribution of the dispersed rubber component has two peaks.

14. A grafted rubber-containing styrenic resin which comprises a matrix comprising a styrenic resin and a rubber component dispersed therein in particle form, wherein the graft ratio of a styrenic monomer relative to the rubber component is not less than 2.5, and the mean particle size of the dispersed rubber component is 0.3 to 3 μm.

15. The grafted rubber-containing styrenic resin according to claim 14, wherein the rubber component is a diene rubber, and the microdomain structure is a core/shell structure.

16. The grafted rubber-containing styrenic resin according to claim 1, wherein the number average molecular weight Mn (T) at the time the conversion reaches about 10 to about 20% by weight is 20,000 to 200,000, the number average molecular weight Mn (L) at the time the conversion reaches about 60 to about 90% by weight is 50,000 to 300,000, and the value of the Mn (L) is 1.5 to 50 times larger than the value of the Mn (T).

* * * * *